(12) United States Patent
Grella

(10) Patent No.: US 12,704,372 B2
(45) Date of Patent: Aug. 11, 2026

(54) METHOD FOR DETERMINING FLUID FLOW CHARACTERISTICS AND ENERGY EFFICIENCY THROUGH TEMPERATURE DIFFERENTIAL ANALYSIS

(71) Applicant: Dexter Technology, LLC, Shrewsbury, MA (US)

(72) Inventor: Joseph E. Grella, Shrewsbury, MA (US)

(73) Assignee: Dexter Technology, LLC, Shrewsbury, MA (US)

( * ) Notice: Subject to any disclaimer, the term of this patent is extended or adjusted under 35 U.S.C. 154(b) by 514 days.

(21) Appl. No.: 18/207,710

(22) Filed: Jun. 9, 2023

(65) Prior Publication Data

US 2024/0027189 A1 Jan. 25, 2024

Related U.S. Application Data

(60) Provisional application No. 63/351,164, filed on Jun. 10, 2022.

(51) Int. Cl.
*G01B 21/10* (2006.01)
*F26B 21/37* (2026.01)

(52) U.S. Cl.
CPC .............. *G01B 21/10* (2013.01); *F26B 21/37* (2026.01)

(58) Field of Classification Search
CPC ....... G01B 21/10; F26B 21/12; G01F 1/6847; H04Q 2209/40; H04Q 2209/823; H04Q 9/00; G01K 3/14; G01K 13/02; G01K 17/00; G01K 1/143; G06Q 10/04; G06Q 10/063; G06Q 50/06; G06Q 50/163
See application file for complete search history.

(56) References Cited

U.S. PATENT DOCUMENTS 11,262,247 B1 * 3/2022 Cardwell ............... G01K 1/143
11,287,291 B1 * 3/2022 Cardwell ............ G01M 17/007
11,293,794 B1 * 4/2022 Volftsun ................ G01F 1/6847
11,686,626 B2 * 6/2023 Roghanizad ........... G01N 25/18
374/100
2004/0204885 A1 * 10/2004 Wang ...................... G01F 25/10
702/45

(Continued)

FOREIGN PATENT DOCUMENTS

EP 3196603 A1 7/2017
KR 101393227 B1 * 5/2014 ............. G01K 13/02

(Continued)

OTHER PUBLICATIONS

International Search Report, PCT/US2023/024900, Sep. 25, 2023, pp. 1-4.

*Primary Examiner* — Peter J Macchiarolo
*Assistant Examiner* — Mireille S Sadate-Moualeu
(74) *Attorney, Agent, or Firm* — Armis IP Law, LLC

(57) ABSTRACT

A fluidic flow restriction measurement device measures the flow characteristics of fluids in ducting, including dryer ventilation systems. By monitoring the exterior temperature of the ducting, and having knowledge of the surrounding ambient air, principles of heat transfer, fluid flow and thermodynamics accurately determine the severity of diameter restriction on the inside of the ducting in terms of a layer of a substance coating the interior diameter or periphery of the duct or other conduit.

21 Claims, 15 Drawing Sheets

(56) References Cited

U.S. PATENT DOCUMENTS

2016/0084693 A1* 3/2016 Lang .................. F24D 19/1048
702/45
2017/0205265 A1* 7/2017 Kolahi .................... G01F 25/10
2019/0292716 A1* 9/2019 Yu ........................... D06F 58/50
2020/0032494 A1* 1/2020 Trescott .................... E03B 7/09
2020/0103293 A1* 4/2020 Rud ....................... G01K 13/02
2020/0408580 A1* 12/2020 Gebhardt ............. G01F 1/6884
2021/0372837 A1* 12/2021 Alcorn .................... G01F 1/668
2022/0113197 A1* 4/2022 Cardwell ............... G01K 1/143

FOREIGN PATENT DOCUMENTS

KR 1020160128294 A 11/2016
WO WO-2021003140 A1 * 1/2021 ............ G01N 25/18

* cited by examiner

METHOD FOR DETERMINING FLUID FLOW CHARACTERISTICS AND ENERGY EFFICIENCY THROUGH TEMPERATURE DIFFERENTIAL ANALYSIS

RELATED APPLICATIONS

This patent application claims the benefit under 35 U.S.C. § 119(e) of U.S. Provisional Patent App. No. 63/351,164, filed Jun. 10, 2022, entitled "METHOD FOR DETERMINING FLUID FLOW CHARACTERISTICS AND ENERGY EFFICIENCY THROUGH TEMPERATURE DIFFERENTIAL ANALYSIS," incorporated herein by reference in entirety.

BACKGROUND

Modern technology brings many conveniences to humans, propelled by utility infrastructure (electric, gas, oil) from which energy is provided. Inefficiencies in energy consumption can lead to excessive demand on energy resources and are detrimental to the environment. Mechanically operated devices, comprising of ductwork or piping, may be inherently inefficient due to heat transfer losses. However, temperature differentials can indicate potential problems in ducting, such as flow diameter restriction due to insulating material deposited on the inside of the duct. Frequently, the causes of these inefficiencies go undetected, inducing reduced mechanical performance, excessive energy consumption, and increased carbon emissions.

Ductwork and piping for both HVAC and plumbing systems are essential components to the construction of residential and commercial properties. Narrow passageways can become obstructed with foreign objects and other substances such as lint, dirt, and debris. Reduction of the duct's inner diameter due to foreign object deposition, restricts the flow of liquids and gases through the cavity. Flow restriction can elevate pressure within pipes and can adversely impact heating systems or the back-end mechanism which is pressurizing or pumping the fluid through the duct.

SUMMARY

A device for monitoring fluid flow efficiency and diameter restrictions is described herein: One or more sensor(s) monitor(s) the external surface temperature of a conduit subjected to internal fluid flow. One or more sensor(s), placed within the environment or fluid encompassing the conduit, monitor(s) the temperature of the surrounding fluid, hereinafter defined as ambient temperature.

A logic processor computes the severity of the fluid flow restriction using the temperature differential between the exterior surface of the conduit and the fluid encompassing the conduit, the cross-sectional area of the conduit, the length of the conduit, the material properties of the conduit, and the flow characteristics of the fluid within the conduit (temperature, flow rate, viscosity, etc.). The computed restriction, representing the quantity and distribution of material deposition on the inside of the conduit, results in increased thermal resistance to heat transfer between the fluid on the inside of the conduit, and the fluid encompassing the conduit. Thermal resistance of this form results in detectable changes in the heat transfer rate and profile between the fluid conduit and the fluid encompassing the conduit.

One example of a system negatively impacted by internal foreign material deposition and fluid flow restriction is a laundry dryer, commonly referred to as a "clothes dryer" or "dryer". In such appliances, a motorized blower fan draws ambient temperature air over an electric heating element or gas burner and routes the heated air into the drum (where the clothes are located). When wet clothes contact hot air, steam is produced. Throughout the drying cycle, steam must be removed from the system for the laundry to dry efficiently. Steam is directed through the lint filter, and out of the dryer through an exhaust duct.

The motion of the rotating drum produces lint, comprising of fabrics and other components of clothing. Lint, combined with moisture from the drying clothes, results in adhesion between the lint particles and the exhaust ventilation duct. If not routinely maintained, replaced, or cleaned, lint deposition restricts the interior diameter of the duct.

An internally restricted duct will generate increased drying cycle times, increased operational costs, and decreased energy efficiency as moisture is not efficiently removed from the system. Within this context, the system of interest will require more energy from utility infrastructure, raising carbon emissions. For the end-user, lint flow restrictions pose a dangerous risk of fire by lint ignition or dryer malfunction.

The present disclosure sets forth a form of a flow restriction measurement device, comprising of a first temperature sensor in contact with the external surface of a conduit having a cross section subjected to internal fluid flow, and a second temperature sensor, positioned within the fluid encompassing the conduit. The primary temperature sensor monitors the temperature of the external surface of the conduit, wherein the temperature is measured both through and with respect to the accumulation of substance and residue on the interior wall of the conduit. The secondary sensor monitors the ambient temperature of the fluid encompassing the conduit.

A printed circuit board employs a processor with logic for processing data and calculating both the quantity and distribution of foreign object deposition on the interior of the conduit, by implementing fundamentals of heat transfer, fluid mechanics, and thermodynamics. In addition to the measured temperature differential, processor logic utilizes variables of the observed system including the cross-sectional area of the conduit, the length of the conduit, the material properties of the conduit, and the flow characteristics of the fluid within the conduit (temperature, flow rate, viscosity, etc.) to generate results.

Network integration with local, internet and cellular access allows for transmission of flow metrics to mobile or networked devices. On-board audiovisual indicators enable communication to end-users for notifications related to potential blockages, hazardous accumulation, decreased efficiency, etc.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, with emphasis instead being placed upon illustrating the principles of the invention.

DETAILED DESCRIPTION

Figure 1:
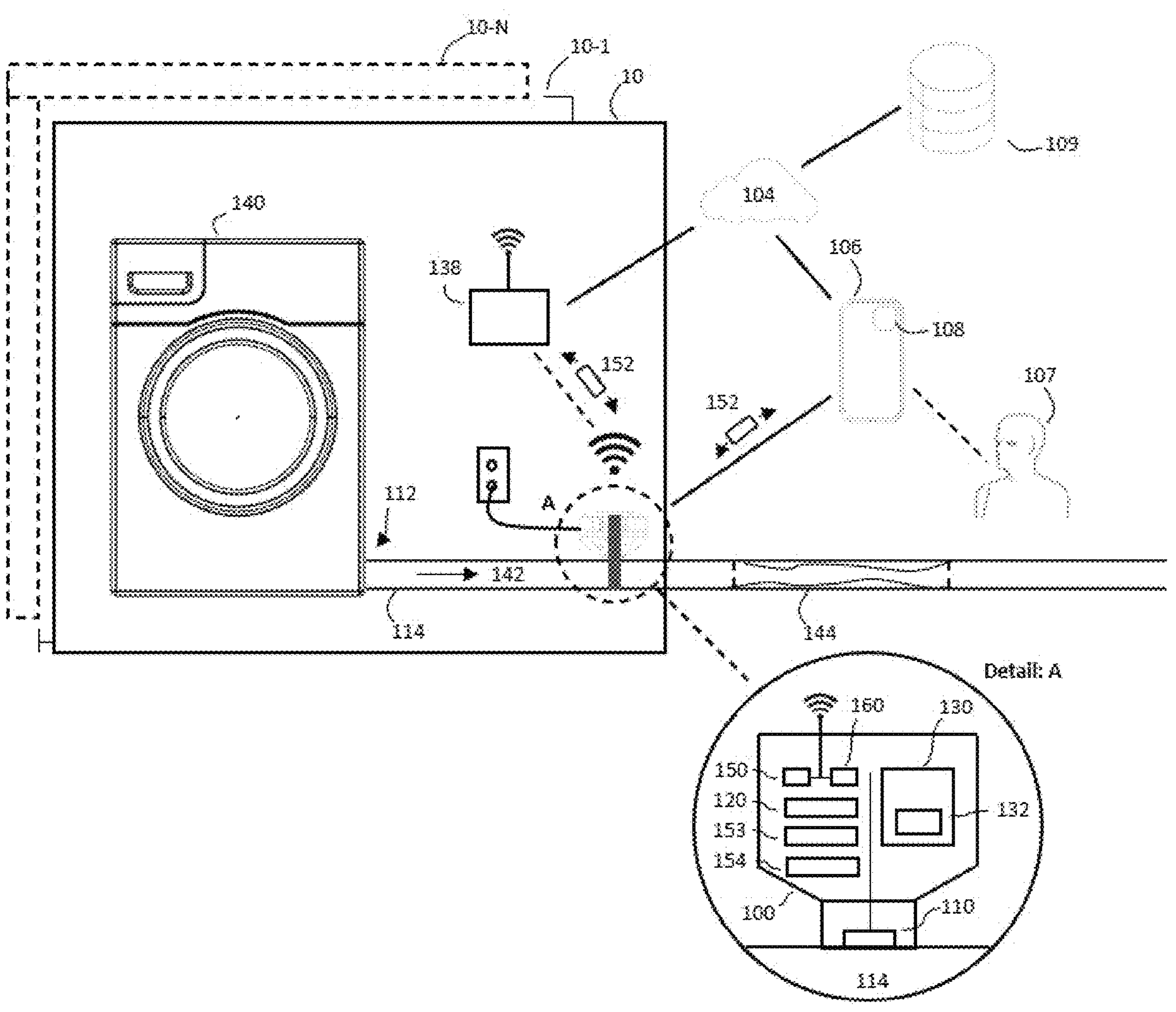
FIG. 1 illustrates a context diagram of the flow restriction measurement device as disclosed herein.

An initial overview of the inventive concepts is provided below, and then specific examples are described in further detail later. This initial summary is intended to aid readers in understanding the examples more quickly but is not intended to identify key features or essential features of the examples, nor is it intended to limit the scope of the claimed subject matter.

The description below presents an exhaust vent for a clothes dryer appliance as an example of a conduit subjected to internal fluid flow containing substance deposition on interior wall surfaces, resulting in flow restriction. The length of dryer exhaust ductwork can vary depending on the application and the available routing space within the building/residence in which the dryer resides. Air, with substantial heat, is forced through the dryer duct to an exterior wall of the building. Any suitable fluid duct, vent, conduit, or pipe may benefit from the principles disclosed herein.

Consumer and industrial clothes dryers generate substantial heat from either a 240 VAC heating element or gas fired burner. Exhaust ducting is prone to accumulate lint particles over time, thus requiring proactive maintenance to maintain adequate fluid flow. Lint can accumulate on the interior walls of the duct and, if unchecked, impede dryer performance and lower efficiency by reducing the inner diameter of the exhaust duct. Restrictions lead to increased drying times, increased utility consumption, increased carbon emissions, increased operating costs and may also present an overheating/fire hazard due to inadequate airflow. Lint is a thermal insulator, and resists heat transfer from the fluid (air) on the inside of the conduit to the fluid (air) surrounding the conduit. Accordingly, configurations herein substantially overcome the above-described shortcomings by affixing the embodiment device to the external surface of the conduit wall. The embodiment monitors the temperature differential between the surface of the conduit and the ambient air over time, and, in conjunction with predictions from heat transfer and fluid dynamics simulations, determines the thickness and composition of the material forming thermal resistance on the inside of the conduit. Heat transfer profiles and rates through the lint layer are predictive of the lint layer thickness traversed by the heat.

A particular example configuration needs only to affix to the outside of the duct without breaching or piercing the duct. A printed circuit board (PCB) resides in the housing, comprising of the two temperature sensors used to determine the temperature differential measurements. A microprocessor implements logic, such as signal processing, filtering, and statistical analysis, to calculate parameters such as thickness of the flow restriction substance, flow rate, pressure, and energy efficiency. A memory device stores system settings and key data metrics for historical retrieval and machine learning (ML). A wireless radio, with Bluetooth, Wi-Fi, and/or Cellular capabilities, communicates with a networked database, mobile/web applications, and internet-of-things (IOT) hubs, to allow end-users to configure, customize and monitor the performance of the device as well as perform over-the-air (OTA) firmware updates. Audio and visual indicators emit signals (light, tone, voice) in response to user-defined metrics including, but not limited to, severity of thermal resistance, energy efficiency, temperature, or energy cost exceeding a predetermined threshold.

FIG. 1 illustrates a context diagram of the flow restriction measurement device (device) as disclosed herein. Referring to FIG. 1, in a monitored environment 10, a flow restriction measurement device (device) 100 includes a conduit sensor 110 in contact with an external surface 112 of a conduit 114 subjected to internal fluid flow and operable for thermal sensing. In one example arrangement, the conduit sensor 110 may be a thermistor, thermocouple, infrared sensor, infrared camera, integrated-circuit (IC) temperature sensor, or resistance temperature detector (RTD). A temperature sensor 120, measuring the temperature of the fluid encompassing the conduit, monitors an ambient temperature in the environment 10 through which the fluid conduit 114 passes. A circuit 130 in the device has logic 132 for computing thickness and composition of the material forming thermal resistance 144 on the inside of the conduit 114 based on the temperature differential between the surface of the conduit 114 and the ambient air in environment 10 over time, and, in conjunction with predictions from heat transfer, fluid dynamics simulations and machine learning.

The conduit 114 leads from an interface to a fluid source 140, such as a clothes dryer appliance, such that the fluid source 140 emanates a flow 142 having a temperature. Any substance, material, residue, or foreign object residing on the inside of the conduit 114, such as an accumulated substance 144, will increase resistance to fluid flow 142 through the conduit 114. A substance 144 residing on the interior of the fluid conduit 114, will increase thermal resistance to heat transfer between the fluid encompassing the conduit in environment 10 and the fluid flow 142. Detectable differences in temperature due to increased substance 144 will appear present at the external surface 112 of the fluid conduit 114.

In one example, a dryer appliance representing a fluid source 140 has an unknown exhaust temperature that is within a range dependent on the cycle temperature selection of the end-user and the density (size and moisture) of the load. Device logic 132 implements intelligent pattern learning algorithms over time to adjust the exhaust temperature value input into the heat transfer and fluid dynamics simulations that are used to generate fluid flow restriction predictions. As exhaust temperature is lowered by end-user configuration, device logic 132 uses similar learning principles, as well as statistical analysis to discern between a lowered exhaust temperature of flow 142 and restriction of flow 144.

The device 100 employs network interfaces 150, 160 such as, but not limited to, ethernet (LAN), wireless (Wi-Fi®), Bluetooth®, Cellular, Satellite, or similar medium. The device 100 employs network interface 150 for communication with remote resources such as, but not limited to, additional networks, servers, cloud-based services 104, databases 109, etc. The device 100 employs network interface 160 for local communication with remote devices such as, but not limited to, computers, mobile devices, cell phones, tablets, smart-watches, virtual assistants, IOT devices, PLCs, workstations, etc.

The device employs a network communication structure where logic 132 is configured to invoke the network interfaces 150, 160 for transmitting and receiving messages 152.

In one example, messages 152 can be relative to device 100 such as, but not limited to, device status, user data, user settings, conduit monitoring performance, flow restriction alerts, flow efficiency alerts, flow temperature alerts, maintenance reminders, etc. or other data relative to the fluid flow 142 within the conduit subjected to analysis. In one example, the termination of the fluid source 140 signal, substantial temperature drop for flow 142 as measured by sensor 110, or convergence between temperature measurements by conduit contact temperature sensor 110 and ambient temperature sensor 120 can be used to deliver messages specific to the completion of task by the clothes dryer appliance (flow source 140).

The device employs a local audible annunciator 153 operable for emitting signals such as, but not limited to, buzzer tone, speaker tone, voice, etc. The device employs a local visual annunciator 154 operable for emitting signals via visual indicators such as, but not limited to, LEDs, LCD panels, etc. Annunciators 153, 154 enable standalone operation for device 100, without establishing network interfaces 150, 160. In one example, signals can be relative to device 100 such as, but not limited to, device status, user data, user settings, conduit monitoring performance, flow restriction alerts, flow efficiency alerts, flow temperature alerts, maintenance reminders, etc. or other data relative to the fluid flow 142 of the conduit 114 subjected to analysis.

In one embodiment, visual annunciator 154, includes a front-panel display employing LED indicators 174, forming a light array. The light array indicates ranges of metrics defined by device 100 such as, but not limited to, flow restriction, flow temperature, flow efficiency, etc. The color of the light array and the number of indicators illuminated 174 represents the value of the target metric (as a percentage), and the level of severity for action by user 107. In an example for a flow restriction metric, the device 100 would employ the circuit 130 and logic 132 to illuminate 75% of the indicators 174 red, representing 75% flow restriction with immediate attention required. Troubleshooting and/or error codes may also be depicted by various combinations of illuminating, flashing or modifying the color of the light array indicators 174. LEDs 174 are of the digital RGB type and enable full customization of color for different types of displayed data.

A user device 106 invokes a front-end application 108, referenced as an "App" herein, for granting a user 107 ability to interface with device 100 via a secondary device 106, such as, but not limited to, mobile devices, cell phones, tablets, smart-watches, virtual assistants, IOT devices, PLCs, workstations, etc. Connection between App 108 and device 100 is employed by network interfaces 150, 160.

If network interface 150 is invoked, App 108 provides additional informational displays, enabling the user 107 to monitor and control the device 100 in conjunction with a back-end system such as, but not limited to, additional networks, servers, cloud-based services 104, databases 109, etc., via a server-based networked account for device 100. If network interface 160 is invoked, the App 108 enables the user 107 to configure, monitor, and control the device 100 directly.

In one example, configuration includes, but is not limited to, the scanning for nearby networks, user submission of network credentials, network connection validation, creation of server-based network accounts, etc. Monitoring includes, but is not limited to, retrieving data from device 100 such as fluid source 140 flow 142 conditions, flow restriction alerts, flow efficiency alerts, flow temperature alerts, maintenance reminders, etc. or other data relative to the fluid flow 142 of the conduit 114 subjected to analysis. Control includes but is not limited to, submission of user settings, requesting over-the-air remote firmware upgrades, etc.

App 108 allows user 107 to link a plurality of device 100 to networked account. Each of the plurality of devices can be accessed individually, but in one example, the App 108 allows the user 107 to monitor a plurality of devices if the user requires multiple device 100, such as in, but not limited to, apartment complexes, rental properties, laundromats, college campuses, etc. In another example, the user 107 may invoke App 108 to link and monitor a plurality of devices if the user requires multiple device 100, for ductwork and pipes in industrial HVAC or plumbing systems.

In one example, such as the dryer configuration, App 108 can be configured to allow users to subscribe to notifications for a specific device 100, monitoring a flow source 140, in an environment 10, where a plurality of flow source 140 and a plurality of device 100 reside. Locations could include, but are not limited to, apartment complexes, rental properties, laundromats, college campuses, etc. In one example, users can subscribe to notifications declaring an end of cycle signal invoked by flow source 140, read by device 100, and transmitted over network interfaces 150, 160. In public settings, such as those listed herein, users can be notified when their laundry is dry, if using legacy or modern dryer appliances in commonly shared spaces.

In general, the flow restriction is represented as the percentage of inner diameter reduction of the conduit under analysis. Thus, for example, a 4 inch inner diameter conduit with 75% flow restriction, has an internal diameter of 1 inch. In this particular dryer configuration example, the device 100, identifies a problematic occlusion from foreign substance 144 when the interior diameter of the conduit 114 reduces to 20% of the original interior diameter. This correlates to approximately 0.4 inches of lint accumulation, denoting a 0.8 inch diameter reduction of the inner surface of the fluid conduit 114, typically a 4 inch diameter vessel. Any suitable threshold or diameter reduction percentage may be employed, as well as any suitable conduit 114 and substance 144 accumulation.

Incremental annunciator messages, by method such as, but not limited to, audible annunciator 153, visual annunciator 154 and application 108 may indicate a problematic percentage, such as 50%, 75% or 80% of a target metric. Target metrics may include, but are not limited to, problematic diameter reduction percentage, problematic flow temperature, problematic flow rate, etc. In the example dryer configuration, target metrics can include, but are not limited to, problematic cycle time, problematic energy consumption, problematic energy efficiency, etc., denoting the dryer is taking longer, using more energy, or in a potential hazardous state due to flow restriction by substance 144. For example, the flow logic may compute one or more of an overtemperature condition, an undertemperature condition and an excessive cycle length, and generate and send a message to the user device or GUI regarding mechanical or electrical anomalies with the appliance.

As will be described below, other conduits exhibiting a thermal pattern may be employed, such as HVAC (Heating, Ventilation, Air Conditioning), hot water supply and cooling or heat exchange piping or vessels, such as to a radiator structure.

Conventional approaches perform pressure measurements for assessing blockages. They measure temperature, not from the flow of fluid through the vessel, without computing an accumulation or effect of an substance coating on the internal walls of the conduit. In contrast, the claimed approach exhibits advantageous features, including:

An ability to detect and calculate internal foreign substance accumulation 144 on the interior walls of the fluid conduit using the external wall 112 temperature of conduit and the temperature of the fluid encompassing the conduit in environment 10.

An ability to detect flow rate and severity of flow rate restriction without breaching or accessing the inside of the conduit 114. Prior art solutions often employ flow rate sensors on the inside of the duct, which can quickly become compromised by the foreign substance generating the flow restriction under analysis.

Integrated pressure and flow rate detection systems, featured in modern, high-end dryers, are not available on older dryers, defined as "legacy" herein. The proposed solution allows flow rate and flow restriction detection on legacy ducting systems, including those for legacy dryers.

An ability to estimate the thickness of the foreign substance 144 (such as lint, debris, etc.) causing flow restriction on the inside walls of the conduit, using the temperature of the external wall 112 of the conduit, the temperature of the fluid surrounding the conduit in environment 10, and simulations from the engineering principles of heat transfer, fluid mechanics and thermodynamics.

An ability to use the calculated restriction, and the thickness of the foreign substance 144 on the inside of the conduit 114, to calculate the energy efficiency and operating costs of a fluid source 140 under analysis, such as a clothes dryer.

An ability to use the temperature differential method aforementioned in this document, to discern if observed energy inefficiency is generated by lint accumulation 144 (in lint filter or exhaust duct), appliance failure (electromechanical failure of a component such as a thermostat, timer, heating element, thermal fuse, etc.), or user action (i.e. drying wet towels on a delicate temperature).

In this particular embodiment, a non-invasive design empowers the user to quickly install the product, without the use of tools, by affixing it to the outside of the duct using a strap 171.

In this particular embodiment, a mechanical spring tensioning mechanism, enables the user to firmly compress the device against the conduit 114 under analysis, and ensures uniform, constant contact between the external wall of the conduit 112 and the integrated temperature sensor 114.

An ability to integrate with smart (IOT) controls, present in modern equipment. Through networking interfaces 150, 160, and other communication protocols, equipment manufacturers (such as, but not limited to, clothes dryer, HVAC, plumbing companies) can integrate device 100 with their equipment to retrieve relevant data metrics.

Networking interfaces 150, 160, enable users to configure the device, set desired settings, monitor flow performance, analyze energy inefficiencies, receive relevant notifications, and schedule routine maintenance with local service professionals to keep ductwork clean and ensure equipment is operating efficiently.

App 108 and smart-home integration allow the user to pair a plurality of devices to a user's (server-based) networked account. Users can develop a network of device 100 and monitor the plurality of devices simultaneously. This is advantageous in applications such as large apartments, college campuses, laundromats, multi-family residential buildings, commercial buildings, industrial manufacturing centers, etc.

An ability to track energy consumption for utility companies and energy facilities. Energy consumption can be monitored to help utility companies reach climate emission initiatives.

An ability to adapt this technology to monitor other thermally conductive ducting to observe flow rate resistance for fluids such as oil, gas, water, etc.

Figure 2A:
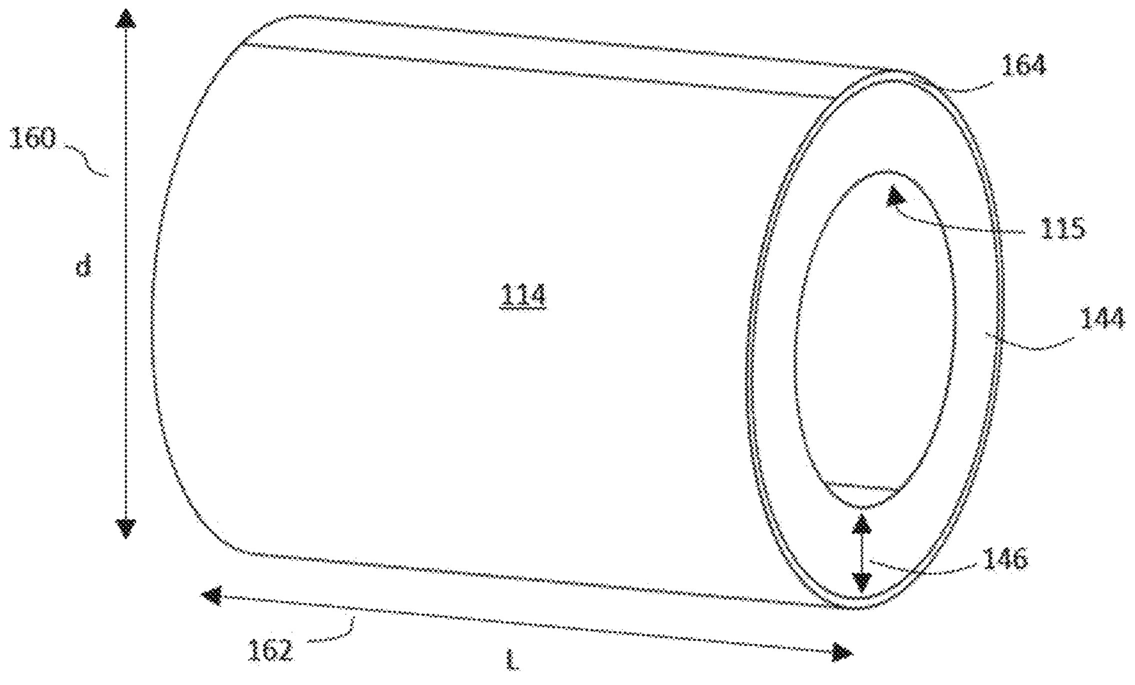
FIG. 2A illustrates a schematic view of a conduit cross section in the context of FIG. 1.

FIG. 2A shows a schematic view of a conduit cross section in the context of FIG. 1. Referring to FIGS. 1 and 2, the fluid conduit 114 has a diameter 160 defining the cross section (circular, in this case, although any suitable periphery may be employed) over a length 162. The conduit itself also has a thickness 164 of the walls of the pipe or other conduit medium.

In the fluid conduit 114, configurations herein leverage principles of thermodynamics, heat transfer and fluid mechanics. Thermodynamics is the study of energy use and transformations from one form or another. It defines the physical properties of substances (solids, liquids, and gasses) involved in energy use or transformation. Heat transfer refers to the process of thermal energy exchange between two or more objects (or systems) due to a temperature difference. Fluid mechanics outlines the study of liquids and gasses at rest (fluid statics) or in motion (fluid dynamics) as well as the interactions between fluids in motion relative to solids.

Configurations herein are primarily based on the laws of heat transfer. In nature, heat is transferred whenever there is a temperature difference between two points in a substance, regardless of the type of substance (solid, liquid, gas, or plasma). The amount of heat transfer that can occur is dependent on the magnitude of thermal resistance between the two points.

Conduction, convection, and radiation are the three forms of heat transfer. Conduction heat transfer occurs in all substances, including solids, liquids and gasses. It is defined as energy transfer due to molecular vibration within the material. Convective heat transfer occurs whenever a moving fluid (either a liquid or a gas) flows past a solid surface that is at a temperature different than the temperature of the fluid. Radiation heat transfer is the energy transfer between objects through electromagnetic waves, without the need for a medium.

To sufficiently express and quantify heat transfer for this application, it is beneficial to define equations that govern the three types of heat transfer described above.

The steady state rate of heat transfer, Q, by conduction for a perfectly insulated rod from one end to another is defined by the following equation:

$$\dot{Q} = \frac{kA(T_1 - T_2)}{L}$$

where A is the cross-sectional area of the object, L is the length of the object, and k is defined as the thermal conductivity of the material under analysis. Thermal conductivity is a material specific constant that is higher in conductors than insulators. T1 and T2 define the temperature difference required for heat transfer.

The rate of heat transfer, $\dot{Q}$, by convection is defined by the following equation:

$$\dot{Q} = hA\Delta T$$

where h is defined as the heat transfer coefficient by convection, A is the surface area exposed to convection and ΔT is the temperature difference between solid and fluid.

The rate of heat transfer, $\dot{Q}$, by radiation is defined by the following equations. In cases where surrounding surfaces are far away from the body and considered "ideal" surfaces for radiation heat transfer, the following equation is utilized. This type of surface is known as a "black body" surface:

$$\dot{Q} = \sigma A\left(T_s^4 - T_{surr}^4\right)$$

where A is the surface area exposed to radiation, $T_{surr}$ is the absolute temperature of surrounding objects (typically ambient) and T s is a black body at uniform temperature. In reality not all surfaces are considered "ideal" black bodies. Therefore, a value of emissivity, E, is included to solve for radiation involving a diffuse surface. Emissivity is a property of the surface and is dimensionless. It can vary from 0 to 1 and is dependent on the surface finish of the material. A black body has an emissivity of 1. For example, polished silver has an E value of 0.02, while rubber has an E value of 0.88.

$$\dot{Q} = \epsilon\sigma A\left(T_s^4 - T_{surr}^4\right)$$

There are many parallels that can be drawn between the electrical circuit theory and heat transfer. In electrical circuit theory, Ohm's law defines current, i, by the voltage drop, ξ, across a resistor divided by the resistance value, R.

$$i = \frac{\Delta\xi}{R}$$

Or, $$\text{flow} = \frac{\text{potential}}{\text{resistance}}$$

Therefore in heat transfer, we can re-arrange the flow rate equations above to produce the following formulas.

$$R_{cond} = \frac{L}{kA}$$

-continued $$R_{conv} = \frac{1}{hA}$$

Configurations herein invoke the assumption that pipes were not subjected to thermal radiation. However, the disclosed approach could encompass thermal heat transfer through radiation if the pipe was in sunlight or near another form of electromagnetic energy.

Figure 2B:
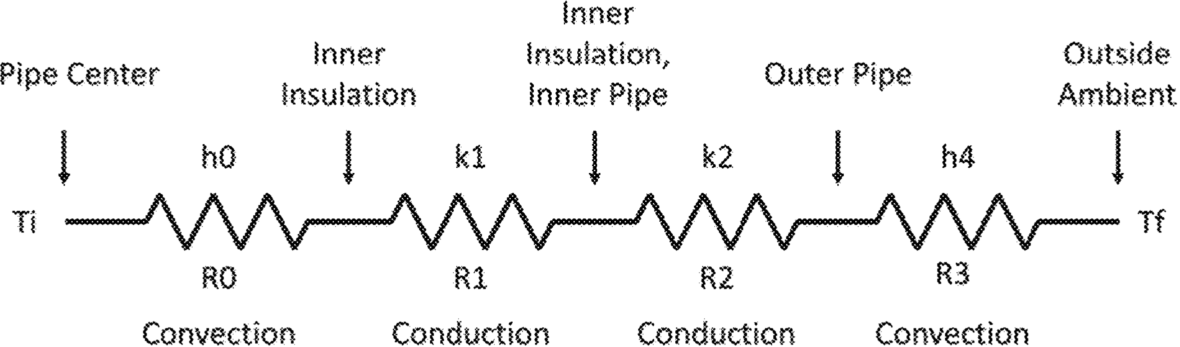
FIG. 2B illustrates a schematic view of an equivalent resistor network for thermal resistance calculation in the context of FIG. 1.

The following is an example using the diagram of FIGS. 2A-2B for assessing the thermal impact by insulation on an interior surface of a conduit on the measured temperature of the exterior surface of a conduit. In the disclosed example, insulation is a lint substance 144 lining the inner surface of the fluid conduit 114. The computed flow restriction identifies a thickness 146 of a substance 144 coating around an inner surface 115 of the conduit 114. The flow restriction is determined from a computed reduction in an effective inner diameter of the fluid conduit 114 based on thermal transfer through an accumulation of the substance.

Conduit Material: Aluminum

Insulation Material: Cotton

Air Internal Temperature (° F.)=125° F. to 150° F.

Pipe Diameter (d)=4 Inches

Pipe Thickness=0.06 Inches (Foil)

Therefore,

Pipe Inner Diameter=Insulation Outer Diameter=3.88 Inches

Pipe Inner Radius=1.94 inches

FIG. 2B illustrates a schematic view of an equivalent resistor network for thermal resistance calculation in the context of FIG. 1. Referring to FIGS. 1, 2A and 2B, comparisons can be drawn from the resistor network comparison in FIG. 2B:

R0=Resistance by Convection to Insulation

R1=Resistance by Conduction through Insulation

R2=Resistance by Conduction through Conduit

R3=Resistance by Convection through Conduit

The resistance equation for conduction is the following:

$$R_{cond} = \frac{L}{kA}$$

For a cylindrical shell defining the fluid conduit 114, the equation becomes:

$$R_{cylinder} = \frac{\ln\left(\frac{r_1}{r_2}\right)}{2\pi Lk}$$

Alternatively, the resistance equation for convection is the following:

$$R_{conv} = \frac{1}{hA}$$

The following equation represents heat transfer coefficient for forced and free air convection. It should be noted that for free convection, x can be a value between 1 and 5. For forced convection, x can be a value between 2 and 100. (BTU=British Thermal Units):

$$h = x\frac{\text{BTU}}{h*\text{ft}^2*R}$$

Combining these equations, we can generate the following representations for R0, R1, R2, and R3

$$R0 = \frac{1}{hA} = \frac{1}{he\left(\frac{\text{BTU}}{h*\text{ft}^2*R}\right)*2\pi(IR)*\left(\frac{1\text{ ft.}}{12\text{ ft.}}\right)*3\text{ ft}} \quad (13)$$

Where:

$$IR = (IR_{pipe} - IT)$$

$$R1 = \frac{\ln\left(\frac{1.94\text{ in} + IT}{1.94\text{ in}}\right)}{2\pi(3\text{ ft})\frac{0.034\text{ BTU}}{h*\text{ft}*R}}$$

$$R2 = \frac{\ln\left(\frac{2.0\text{ in}}{1.94\text{ in}}\right)}{2\pi(3\text{ ft})\frac{137\text{ BTU}}{h*\text{ft}*R}}$$

$$R4 = \frac{1}{hA} = \frac{1}{ho\left(\frac{\text{BTU}}{h*\text{ft}^2*R}\right)*2\pi(2.0\text{ in})*\left(\frac{1\text{ ft.}}{12\text{ ft.}}\right)*3\text{ ft}}$$

Equivalent thermal resistance theory states that resistances need to be equal at the outer wall. This produces the following expression:

$$\frac{T_i - T_3}{(R + R2 + R3)} = \frac{T_3 - T_f}{(R4)}$$

Therefore, $$(T_iR_4 - T_3R_4) = T_3(R_1+R_2+R_3) - T_f(R_1+R_2+R_3)$$

And, $$T_3 = \frac{T_1R_4 + T_f(R_1 + R_2 + R_3)}{R_1 + R_2 + R_3 + R_4}$$

To determine the surface temperature of the pipe, T3, that yields a specific insulation thickness, it is possible to iterate the value of the insulation thickness over a computational loop until the solution converges.

The above calculations provide a theoretical, fundamental basis for the logic 132 computing a thickness of an insulative coating and corresponding flow restriction within a conduit. Theoretical calculations often approximate or require assumptions about variables which may be active or volatile in a real, physical system. Simulation based modeling enables the device 100 to predict thickness of an insulative coating and corresponding flow restriction more accurately.

FIGS. 3A-3F show thermal simulations representing the exterior surface temperature measured by the device of FIG. 1, with respect to the flow temperature generated by flow source 140 in a conduit, pipe or other vessel 114 as in FIG. 2A. Referring to FIGS. 1, 2 and 3A-3F, FIGS. 3A-3B represents thermal simulation at a fixed ambient temperature, 68° F., with a temperature of 115° F. for exhaust flow 142. Insulative substance 144 on the inside wall of the fluid conduit 114 is 0 inches thick in the simulation displayed by FIG. 3A-3B, 0.10 inches thick in the simulation displayed by FIGS. 3C-3D, and 0.25 inches thick in the simulation displayed by FIGS. 3E-3F.

Figure 3A:
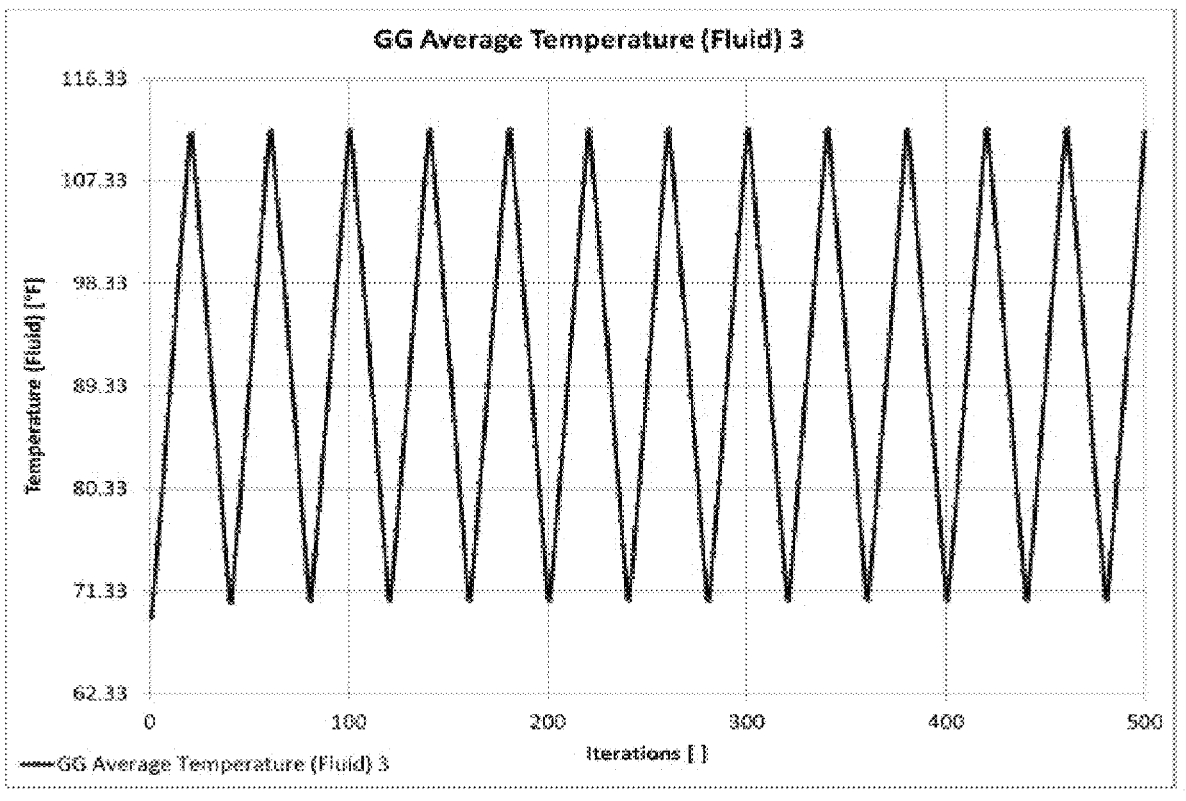
FIGS. 3A-3F illustrate simulated thermal results of the temperature of the exterior of the conduit, with respect to varying amounts of insulation on the interior of the conduit in context of FIG. 1 and FIGS. 2A-2B.
Figure 3B:
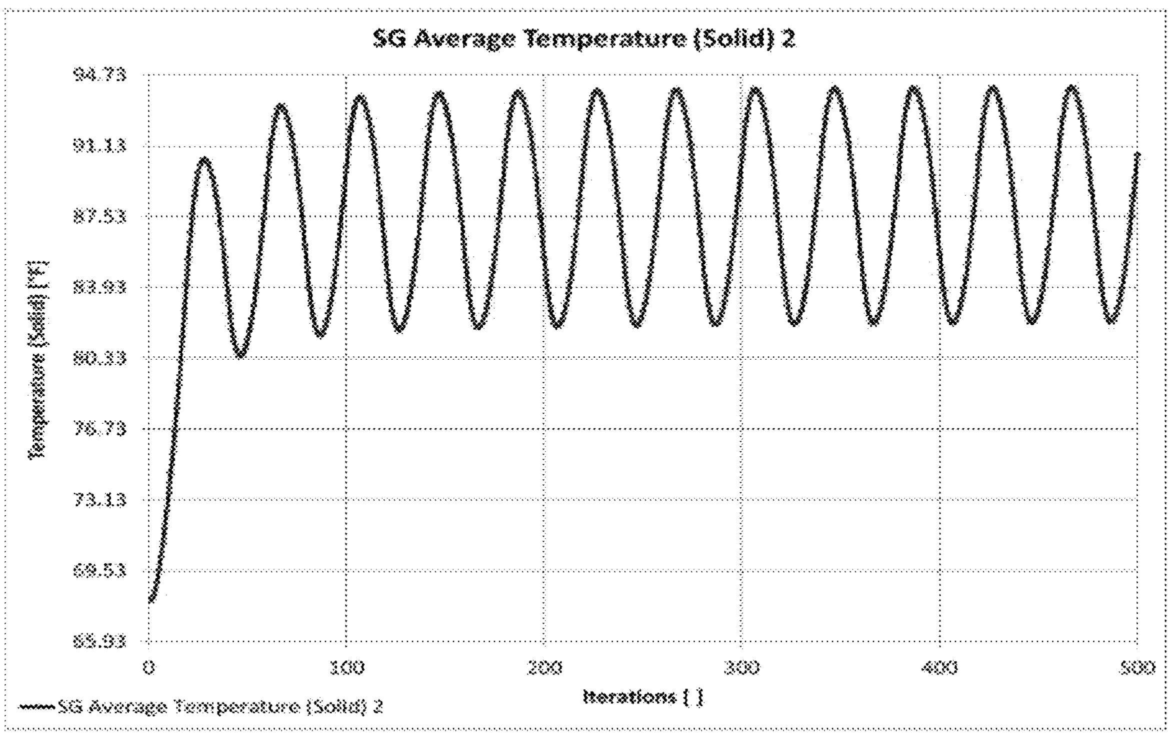
Figure 3C:
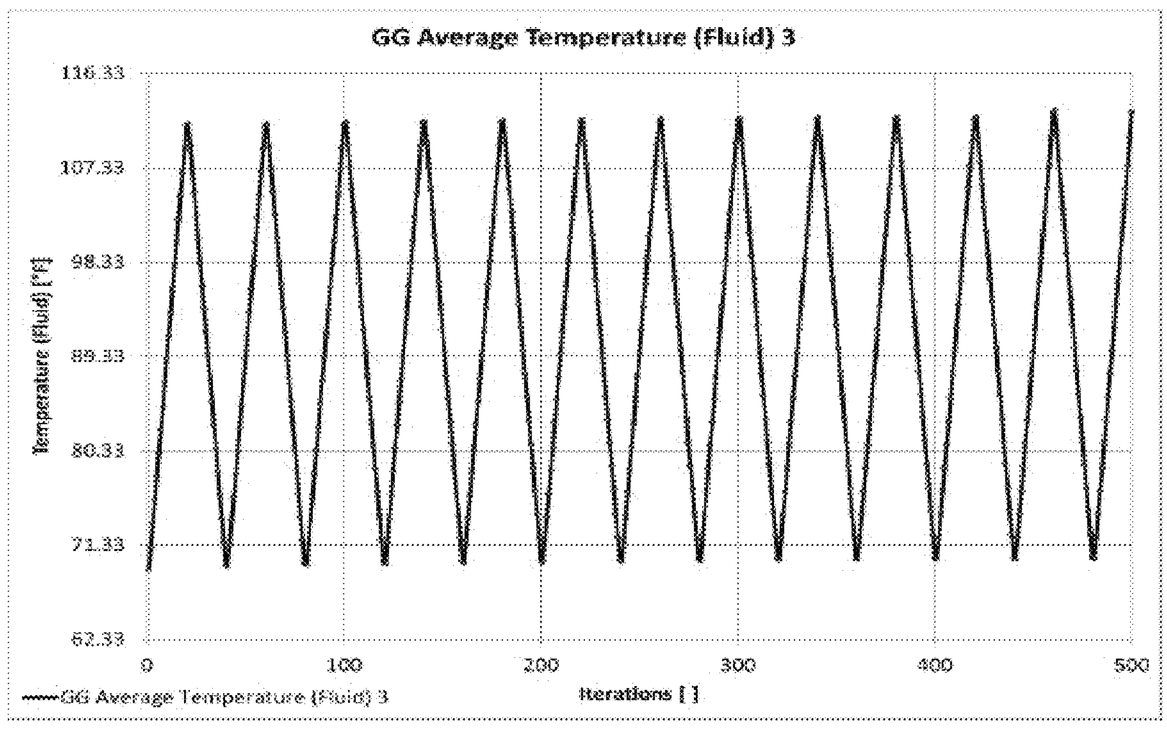
Figure 3D:
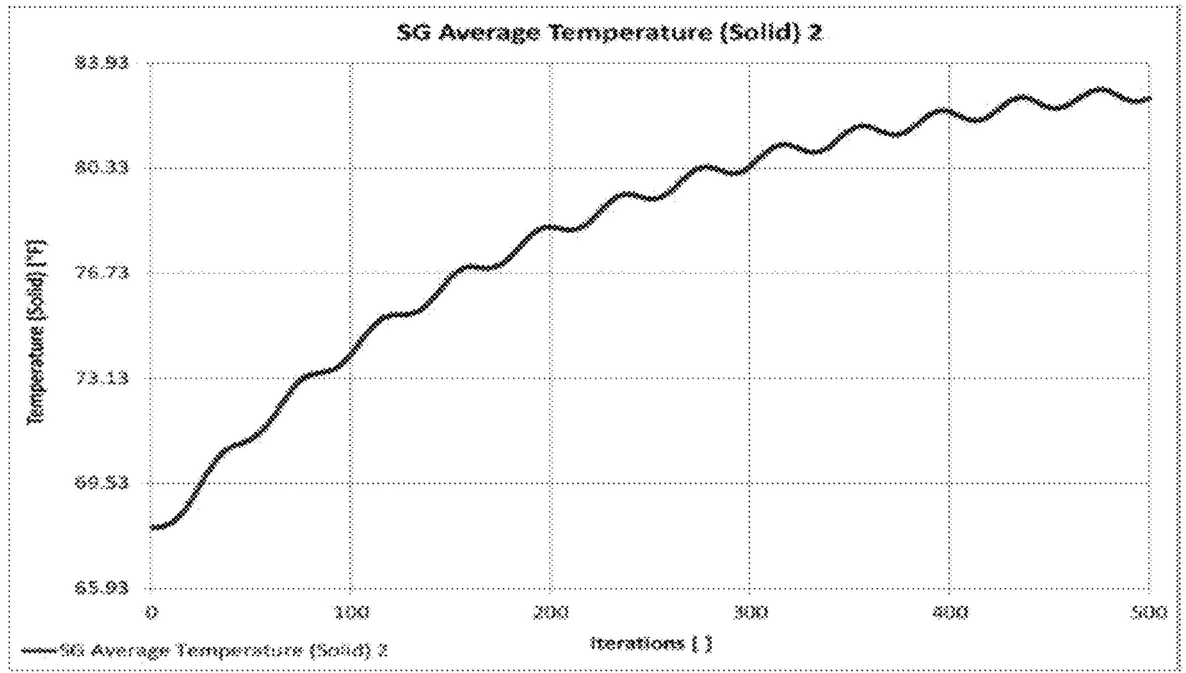
Figure 3E:
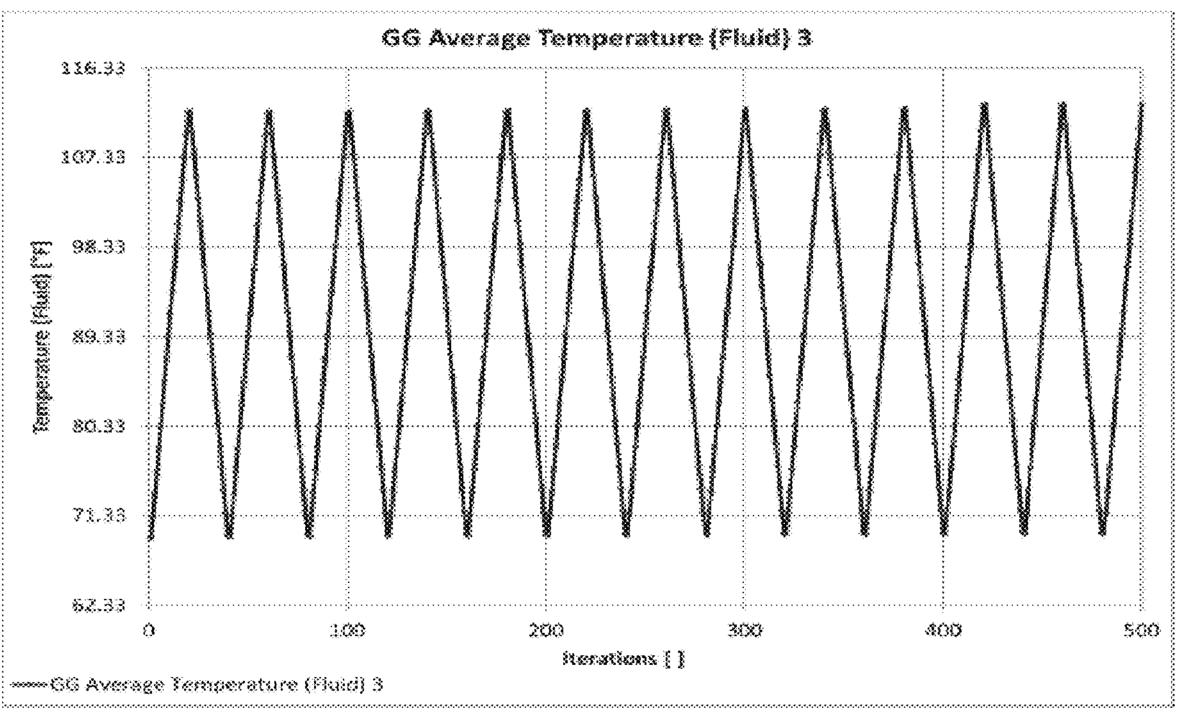
Figure 3F:
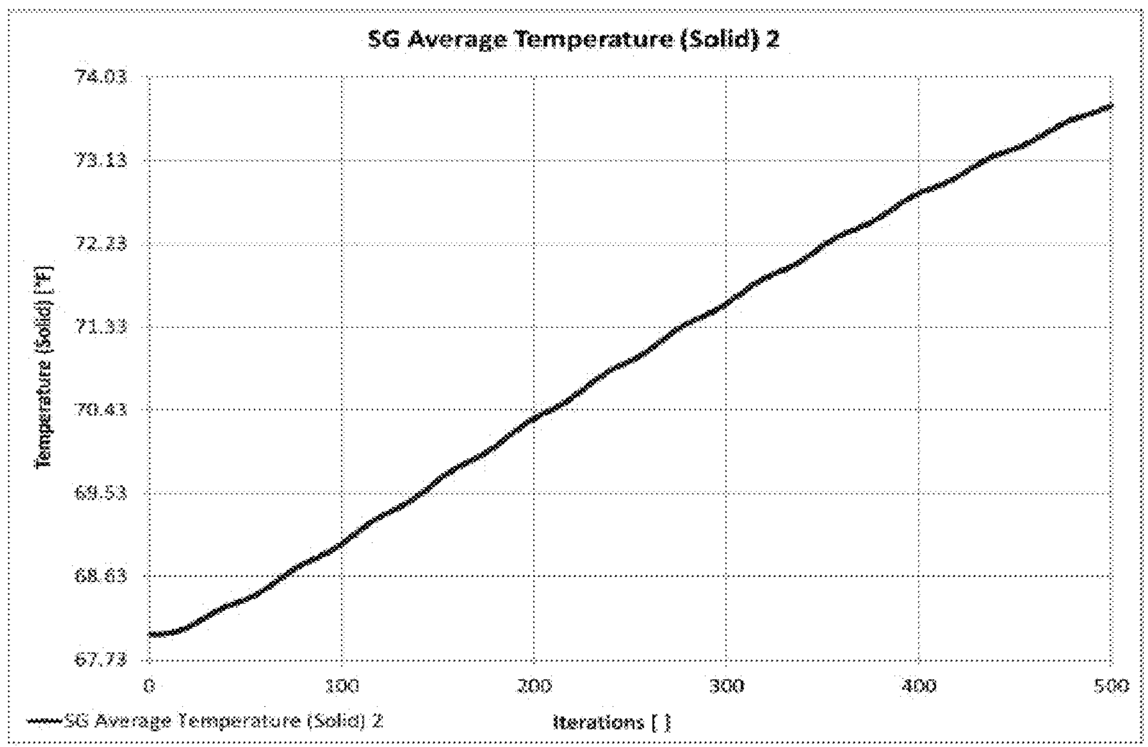

For FIGS. 3A-3F, an air flow rate for conduit flow 114 generated by flow source 140 is 15 feet per second. For a 4 inch diameter exhaust conduit, the equivalent cubic feet per minute rating (CFM) would equate to 80 CFM. The insulative material 144 on the interior wall of conduit 114 is defined to be cotton, exemplifying a typical substance 144 that accumulates inside a dryer duct. FIGS. 3A, 3C and 3E indicate the respective stimulus input of flow source 140 flow 142 temperature, controlled by a cycling thermostat. Dryers implement a simple feedback loop in which a thermostat measures the output air from the drum and controls the switching of the heating element or gas burner. The oscillatory nature of the input signal for this simulation is representative of a standard dryer thermostat. FIGS. 3B, 3D and 3F represent the measured temperature of the respective external surface of the fluid conduit 114.

The data from the simulations generating FIGS. 3A-3F shows an apparent trend, correlating the thickness of the internal insulation 144 to the reduction of the peak temperature of the external surface of the conduit 114. Oscillations in the flow source 140 flow 142 air temperature, induced by the cycling thermostat, become severely dampened as the temperature of the exterior wall of the conduit 112 reacts less quickly to changes in temperature flow source 140 flow 142 air. Heat is transferred less quickly, and less efficiently between the heated flow source 140 (dryer) air and the exterior surface of the conduit 112.

As the flow 142 of heated air within the conduit gives up heat less quickly with significant amounts of interior insulation 144, the overall temperature of the air flow 142 inside the conduit 114 rises. The oscillatory nature of the curve is no longer present, and the curve of the exterior surface of the conduit 112 temperature, appears logarithmic.

As shown in the computations and simulations above, there will be heat transfer between the ambient environment 10 encompassing the conduit and the exterior surface of the conduit 112, as long as there is a temperature differential between the two. Among other factors, the amount of heat transferred will be dependent on the magnitude of the temperature differential as well as the thickness and material properties of insulative substance 144 on the inside of the fluid conduit 114.

When the insulative substance 144 on the inside of the fluid conduit 114 becomes significantly thick, the hot air flow 142 from the flow source 140 (dryer) will have a diminished impact on the temperature of the exterior wall of the conduit 112. The temperature of the ambient air in environment 10 will drive the temperature of the external surface of the conduit 112 closer to the temperature of the air in environment 10.

Despite flow restriction due to the insulative substance 144 on the inside of the fluid conduit 114, the flow source 140 (dryer) control system will still attempt to dry the clothes. The heating element in the dryer will still oscillate about a set point value, determined by the dryer temperature setting and controlled by the thermostat. However, the reduction in exhaust diameter will prevent the expulsion of moisture from the drum, resulting in longer drying cycles that consume more energy.

In addition to monitoring the oscillatory nature of the cycling thermostat with respect to insulative substance 144 on the inside of the fluid conduit 114, there are other characteristics of the drying cycle which indicate flow restriction using the same heat transfer principles described herein. In dryer configurations, the absolute temperature of the external wall of the conduit 112 decreases with increased insulation thickness, substance 144, on the inside of the fluid conduit 114. Additionally, during ramp-up and ramp down of the heating element, the external wall of the conduit 112 becomes less responsive to changing input stimulus from the flow source 140, with increasing insulation thickness, substance 144, on the inside of the fluid conduit 114. This causes the external wall of the conduit 112 to heat less slowly during ramp-up and cool more slowly during ramp-down.

Concurrent simulations show that elevating the exhaust temperature of flow 142 results in a higher external surface 112 temperature of the conduit 114. Increasing the environment 10 ambient temperature induces less heat loss from the conduit 114 to the environment 10, resulting in a higher external surface 112 temperature on the conduit 114. Adversely, lowering environment 10 ambient temperature increases the temperature differential between the fluid encompassing the conduit in environment 10 and the external surface of the conduit 114, resulting in a higher amount of heat loss from the surface of the conduit 114 in the analysis period.

Figure 7:
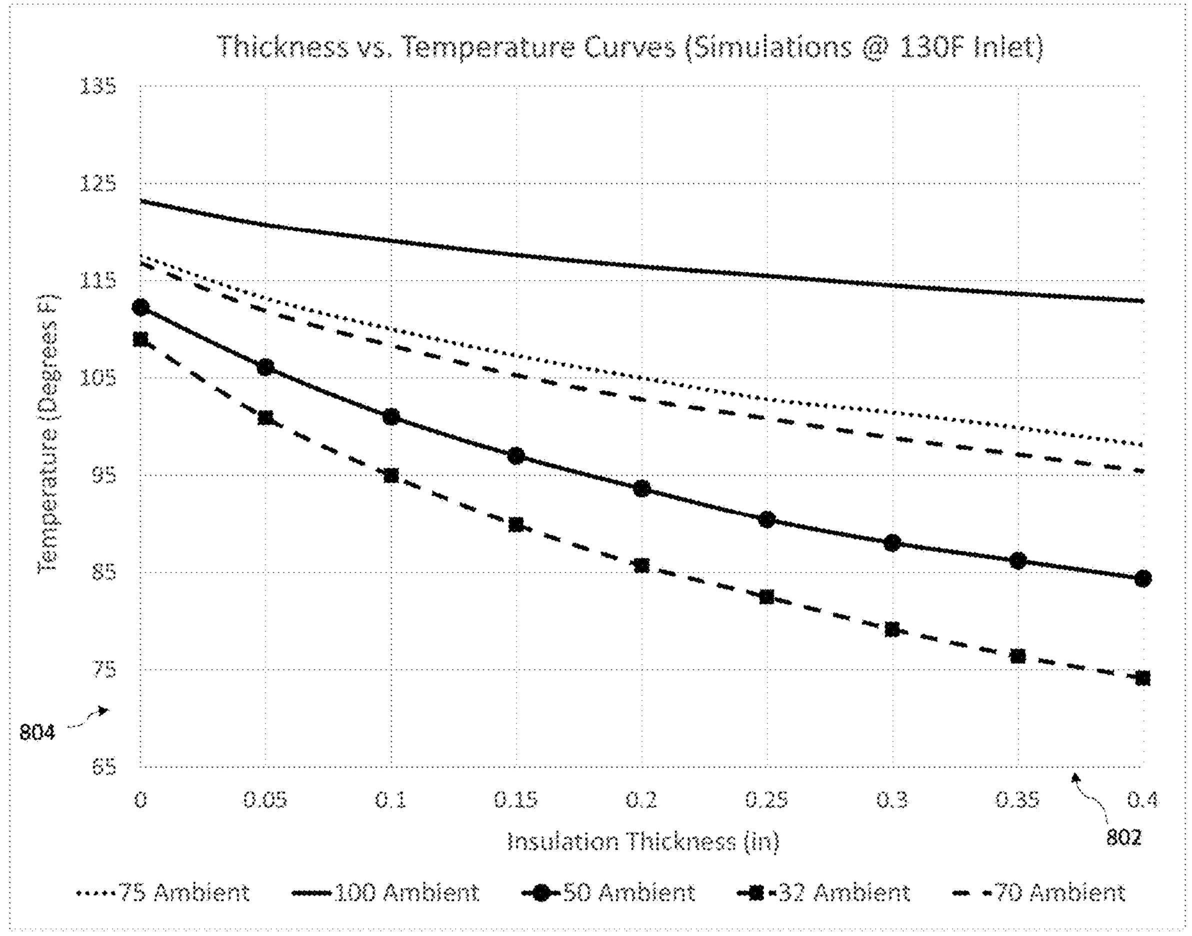
FIG. 7 illustrates data generated by thermal simulation for increasing insulation (substance) in the conduit, with respect to varying ambient temperature at a given internal flow temperature as in FIG. 2.

Compiling simulation results while varying simulation environment 10 ambient temperatures and insulative substance 144 thickness yields FIG. 7. Flow source exhaust temperature for flow 142 remains a constant assumption for generating the data set. The relationship between insulative substance 144 and the exterior surface 112 temperature of the conduit 114, appears exponential in nature, and can be represented by a $4^{th}$ or $5^{th}$ order polynomial.

Figure 8:
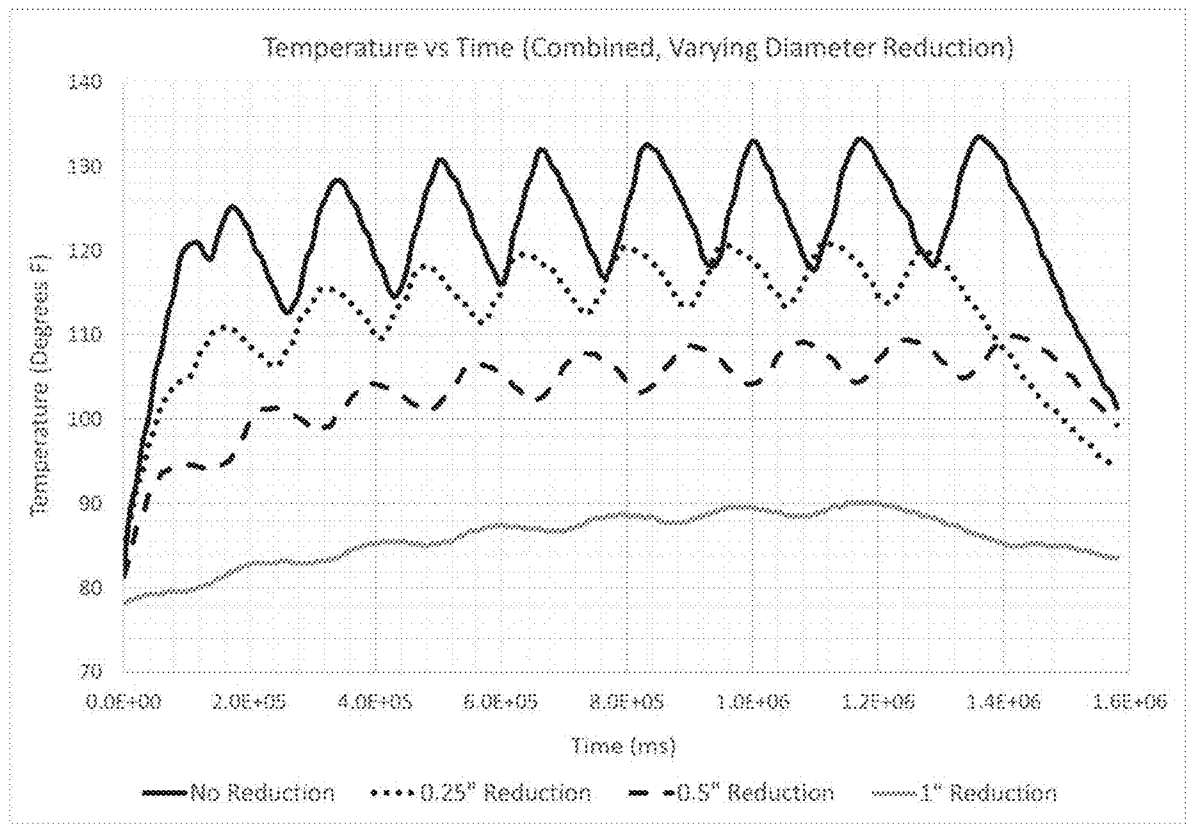
FIG. 8 illustrates graphs of the thermal field-testing results using the embodiment device.

FIG. 8 illustrates graphs of the thermal field-test results using the embodiment device presented herein. In FIG. 8, 4 independent field test cycles are superimposed on a single plot. Each of the field test cases were performed on a clothes dryer in 68° F. environment ambient air 10. Each field test was subjected to the same flow source 140 flow 142 temperature of 140° F. but featured a different thickness of insulation substance 144 on the inside walls of the fluid conduit 114. Each layer of insulation substance 144, had a controlled thickness of 0.125 inches, and the material of insulation substance 144 was cotton. The data observed in the field test environment correlates to that of the simulation profiles observed herein, indicating that the simulation profiles are representative of real-world configurations.

In the clothes dryer configuration, the flow source 140 flow 142 temperature is dependent on user-selection at the flow source 140 operator panel as well as load density and the level of moisture in the load upon cycle start. While the field-tested range of these parameters is small relative to the total temperature of the flow source 140 exhaust, the differential temperature methods for computing insulative substance 144 thickness on the inside wall of the conduit 114 may be slightly inaccurate if the correct flow 142 temperature is not used in the algorithms described herein. One solution is to employ a secondary sensor at the exhaust of flow source 140, adding complexity, size, and cost to the device. The suggested approach overcomes these stated shortcomings by performing statistical analysis on the data set. It can be assumed that drying cycles are a normal, Gaussian, distribution, with most cycles run on higher flow source 140 temperature selections and of moderate density or moisture. A buffer is formed (10-30 cycles or data sets) and the mean and standard deviation are calculated for the buffer. Additional cycles must fall within a defined sigma value of the standard deviation limits, or the data will be discarded. If the new data point is accepted, it is indexed into the buffer. This approach allows the device 100 to react slowly to drastic variations in data samples, ensuring the validity of the output parameters, including, but not limited to, flow restriction, energy efficiency, utility operating cost, etc.

An alternative approach uses machine learning, or an AI model to analyze data points to learn patterns over time, building custom neural networks for each device 100. This is computationally intensive and may require offsite or remote processing via network interfaces 150, 160.

In the device 100 of FIG. 1, the determined insulation substance 144 thickness is a basis for computing flow resistance, such that the logic 132 is configured to: compute a rate of temperature change and peak temperature sensed by the external conduit surface sensor through the substance 144, in conjunction with measuring the temperature of the fluid encompassing the conduit in environment 10. The logic 132 can then determine the thickness 146 of the substance 144 based on the temperature differential analysis methods described herein.

Figure 4A:
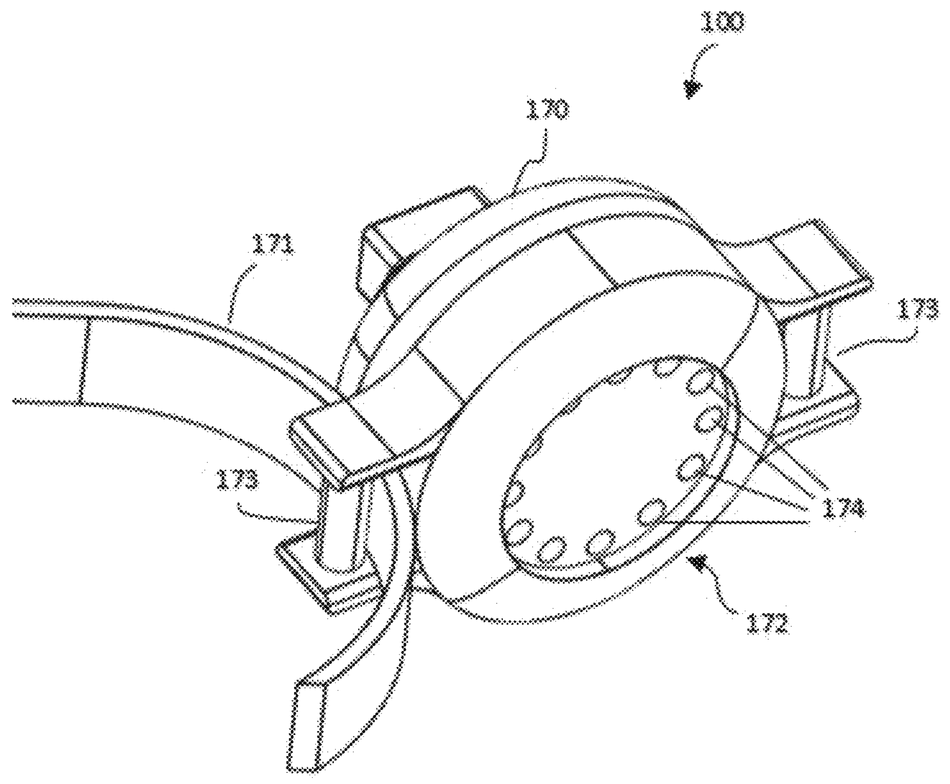
FIG. 4A illustrates a perspective view of the measurement device (device) as in FIG. 1.

FIG. 4A shows a perspective view of the measurement device (device) as in FIG. 1. Referring to FIG. 1 and FIG. 4A, the device 100 includes a flattened cylindrical form factor 170 and a face 172 having indicator LEDs 174 for operation feedback, previously referenced herein.

Figure 4B:
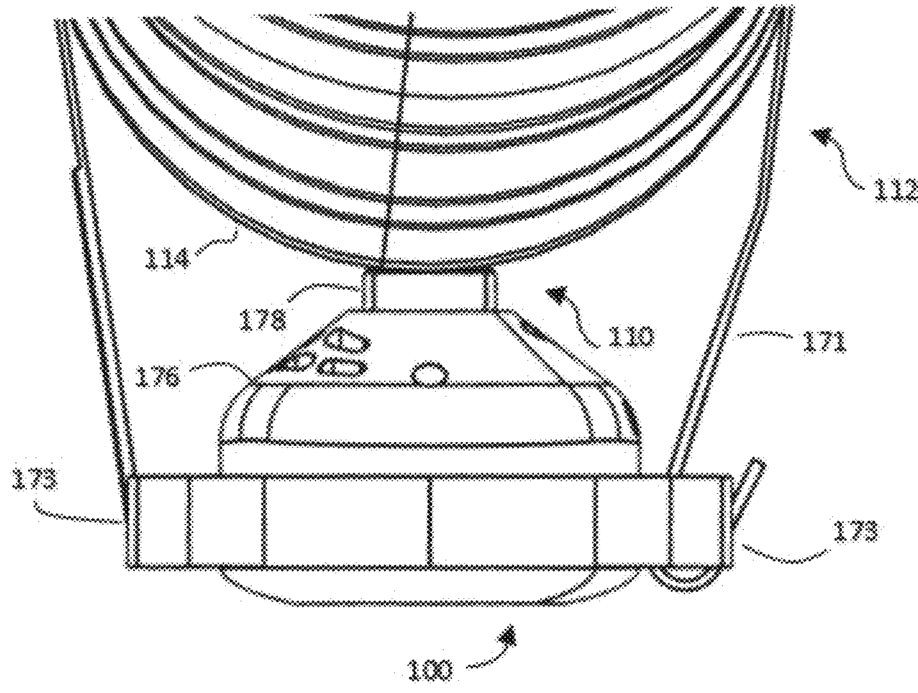
FIG. 4B illustrates a side view of the device engaged with a fluid conduit such as a dryer duct.

FIG. 4B shows a side view of the device 100 engaged with a fluid conduit 114 such as a dryer duct. Referring to FIG. 1 and FIGS. 4A-4B, the device 100 has a tapered side 176 with a general frustoconical shape narrowing to a sensor projection 178 for disposing the conduit sensor 110 in contact with the fluid conduit 114 and interfacing the sensor projection 178 with a variety of conduits, including those with partitions or ridges. The general frustoconical shape spreads partitions to interface the projected sensor 178 with the conduit 114. The sensor projection 178 houses a biasing member such as a spring or pogo pin, discussed further below, and a strap 171 affixes the device 100 to the conduit exterior 112 via strap slots 173.

Figure 4C:
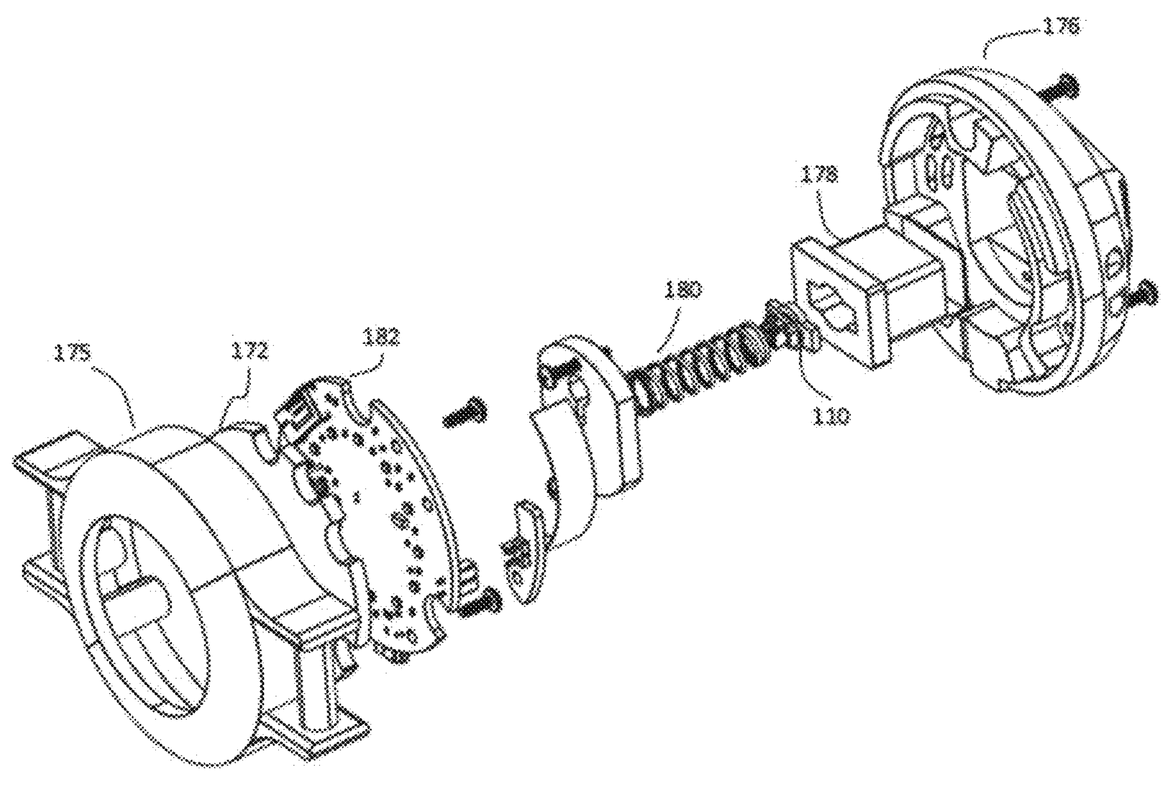
FIG. 4C illustrates a perspective exploded view of the measurement device (device) as in FIG. 1.
Figure 4D:
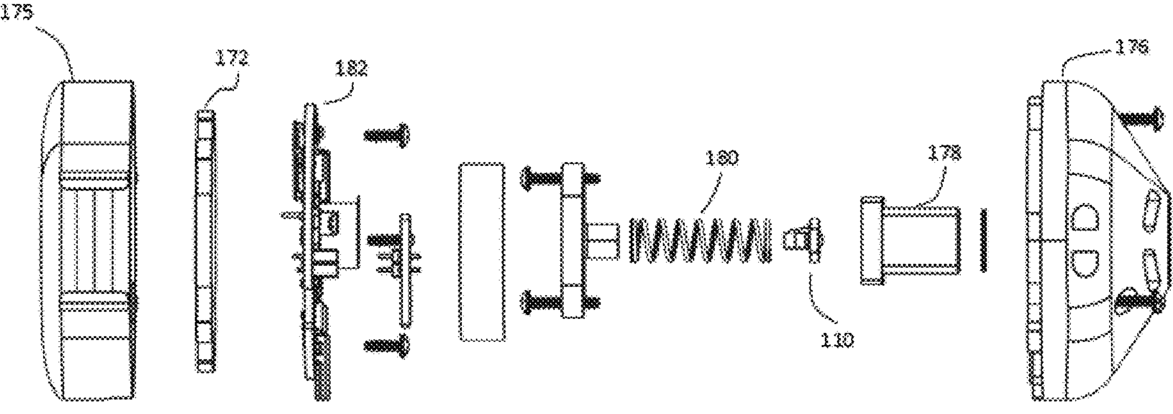
FIG. 4D illustrates a side exploded view of the measurement device (device) as in FIG. 1.

FIG. 4C shows a perspective exploded view of the measurement device (device), and FIG. 4D shows a side exploded view of the device 100 as in FIG. 1. Referring to FIG. 1 and FIGS. 4A-4C, the cylindrical form factor 170 employs a casing 175 attached to the frustoconical tapered side 176 and enclosing the face 172, one or more circuit boards 182 for the circuit 130, and a biasing member 180 extending through the sensor projection 178 for biasing the conduit sensor 110 into contact with the surface 112 of the fluid conduit 114. The conduit sensor 110 may be a thermistor or thermocouple, or other suitable component for delivering a varied electrical characteristic in response to changing surface 112 temperatures.

In contrast to conventional approaches, the claimed approach operates solely on sensing external to the fluid conduit being measured. A smooth, rigid metal surface exterior is most favorable for engaging with the conduit sensor, however any suitable duct/conduit/pipe exterior will suffice. The biasing element 180, such as a spring, biases the conduit sensor 110 into communication with the external surface 112 of the conduit to ensure effective thermal communication for sensing.

Figure 5:
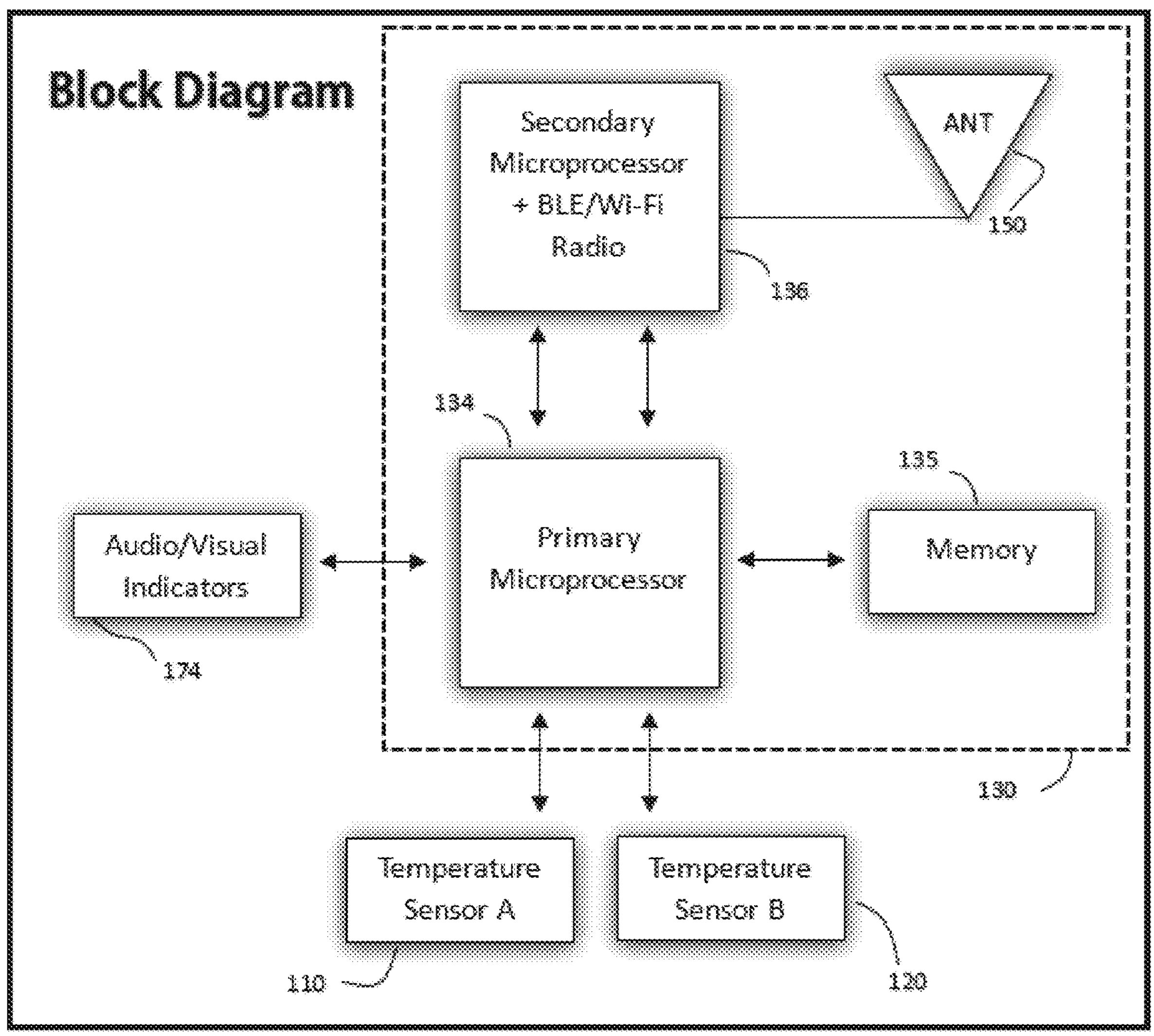
FIG. 5 illustrates a block diagram of the control and measurement circuit (circuit) in the device as in FIG. 1.

FIG. 5 shows a block diagram of the control and measurement circuit (circuit) and peripherals in the device as in FIG. 1. Any suitable microprocessor configuration may be defined in the casing 175 for implementing the features herein. In an example configuration, referring to FIGS. 1-5, the circuit 130 includes a first main processor 134 that provides the on-board logic 132 including code that performs tasks such as processing temperature data, detecting drying cycles, computing diameter restriction, calculating energy efficiency, saving data to memory, displaying results with audiovisual indicators, etc. This main processor 134 also sends data to a second processor 136 equipped with a radio and long range antenna 150, for relaying messages to mobile apps 108, online databases 109, cloud services 104, smart home integration hubs, etc. via network interfaces 150, 160. Coordination of these two processors provides an ability to remotely upgrade device firmware.

While the disclosed approach includes a microcontroller, any form of computer, microprocessor, FPGA, PLC, etc. could be used to process temperature differential data. In the event of computation of an excessive accumulation of lint or other substance 144, the logic 132 initiates an annunciator signal 152 to the audio/visual indicators 174. The annunciator signal is indicative of a threshold of the flow restriction based on a cross section reduction in the fluid conduit 114. An audible signal such as a buzzer or speaker tone alerts the user via the annunciator 153, and the annunciator message 152 is sent concurrently to the user device 106. Other conclusions computed and reported based on patterns of temperature include a duct blockage, electromagnetic failure or an operational inefficiency all based on a series of measured temperature readings. Erratic or inefficient operation may be indicated by the temperature patterns, such as a consistently low temperature indicating failure of a heating element or too low a heat setting by a user that causes the dryer to run longer than it should.

Figure 6:
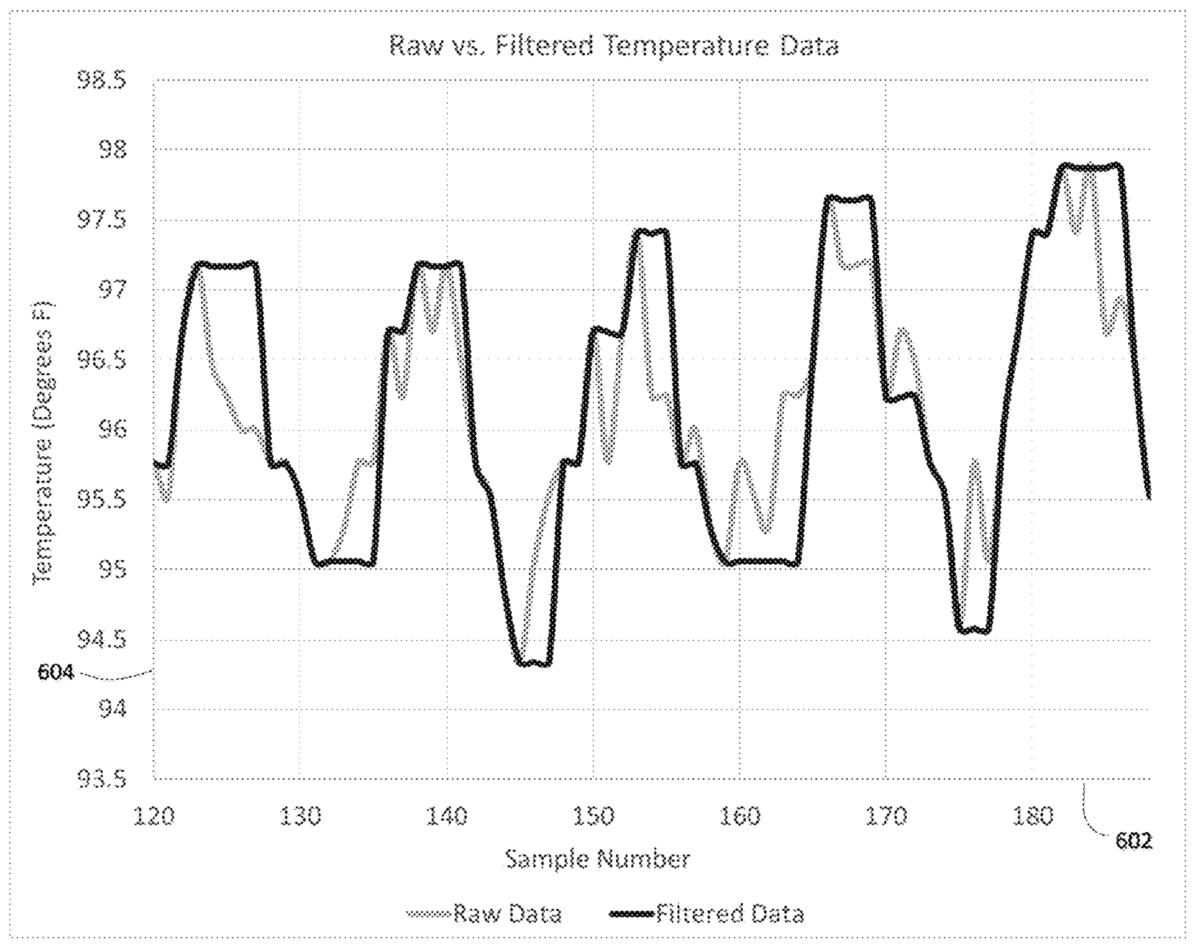
FIG. 6 illustrates a graph superimposing raw and filtered analog signals for temperature recorded by a processor as in FIGS. 1-5.

FIG. 6 shows a graph superimposing raw and filtered temperature signals transmitted from external surface temperature sensor 110, and received by the circuit 130 as in FIGS. 1-5. Referring to FIGS. 1, 6 and 7, in one example, when analog data is read into the device 100 through the conduit sensor 110, intake processing occurs. Raw data from analog sensors, such as conduit sensor 110 tends to be inherently noisy, which can result in small, rapid changes in sensed temperature. In a method to remove any small spikes in temperature, several different digital filtering techniques, hardware filtering and sample averaging can be performed on each temperature measurement value.

The filtering routines described herein examine the history of the curve to determine if the input signal is rising or falling. It buffers data until an upward or downward trend is recognized by the logic 132. The goal of this intake is to discard intermediate temperatures that appear to be noisy but capture the overall trend of the signal. In the logic 132, the amplitude of the signal, the slope of the signal upon changing stimulus, and the frequency of oscillations can be indicators of how quickly the conduit 114 can dissipate heat into the environment 10.

The intake filtering identifies the peaks and valleys of the oscillatory signal as well as the times at which each occurred. This data provides a snapshot that can be used to detect the frequency of the signal. The algorithm also calculates the total length of curve of the signal. When the measured value rises, a positive value is added to the sum. When the value falls, a negative value is added to the sum. The length of the curve is generally a good indicator of how quickly the duct can dissipate heat as oscillatory signals (clean duct) will have a longer length than those that are straight (blocked duct). Outliers are detected on the measured data set using a Z-score method. These outliers are removed for calculation of the average amplitude of heat dissipation in each thermostat oscillation. The standard deviation and frequency of the signal are generated.

FIG. 6 illustrates gathered raw temperature data prior to filtering, as well as filtering results, for intervals on a sample axis 602 and a temperature axis 604 read from the conduit sensor 110.

Figure 9:
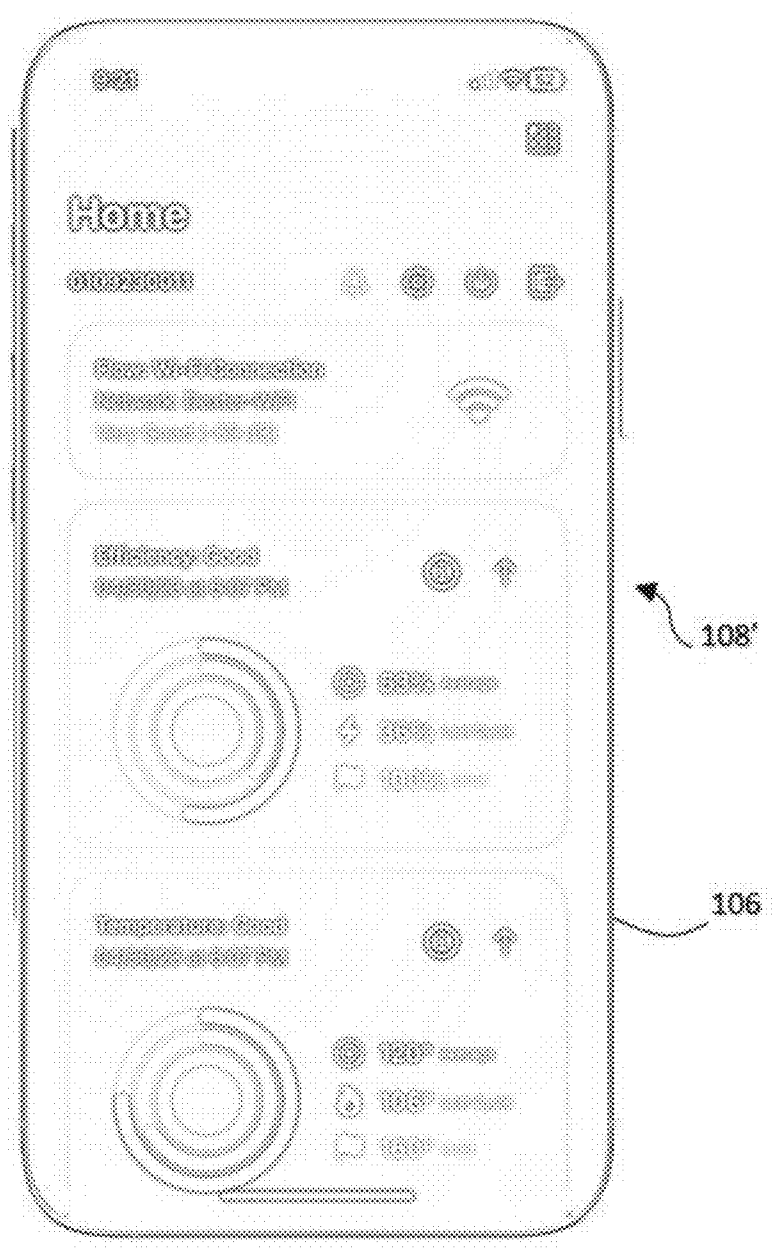
FIG. 9 illustrates a mobile device GUI (Graphical User Interface) in communication with the device of FIGS. 1-8B.

FIG. 9 shows a mobile device GUI (Graphical User Interface) 108' in communication with the device of FIGS. 1-8B. In addition to the annunciator message 152, a variety of other information, trending data, and control may be exchanged via the app 108. The back-end database (DB) 109 is used to monitor each deployed device 100. In particular, device 100 across a plurality of environments 10-1 . . . 10-2, or multiple devices 100 in the same environment may be monitored, such as in a commercial context, previously described herein. The database 109 maintains information such as device health status, cycle history, user settings, alarms, etc., accessible via the app 108.

From this front-end application 108 the end user 107 can view and modify their device data that is stored in the database. However, Bluetooth, Wi-Fi, cellular or any other form of connection is not required for the device to operate. The device 100 is operative "out of the box," utilizing at least the annunciator 153 and front panel face 172 with LED feedback from the indicators 174.

Those skilled in the art should readily appreciate that the programs and methods defined herein are deliverable to a user processing and rendering device in many forms, including, but not limited to, a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A flow restriction measurement device, comprising:

a conduit sensor in communication with an external surface of a fluid conduit having a cross section, the conduit sensor operable for thermal sensing;

an ambient temperature sensor for reading an ambient temperature in an environment through which the fluid conduit passes; and a circuit having flow logic for computing a flow restriction through the fluid conduit based on the thermal sensing and the ambient temperature, the computed flow restriction identifying a thickness of a substance coating around an inner surface of the fluid conduit.

2. The device of claim 1 wherein the flow restriction is based on a computed reduction of an effective inner diameter of the fluid conduit based on thermal transfer through an accumulation of the substance.

3. The device of claim 1 further comprising an interface to a dryer appliance, the dryer appliance having an exhaust flow temperature, the fluid conduit in fluidic communication with the dryer appliance for receiving the exhaust flow, the flow logic configured to compute the flow restriction based on a temperature differential between the exhaust flow temperature and a temperature sensed by the conduit sensor.

4. The device of claim 1 wherein the flow logic is configured to:

compute a rate of temperature change sensed by the conduit sensor;

identify a thermal transfer rate through the substance based on the ambient temperature and a thickness of an accumulation of the substance on the inner surface of the fluid conduit; and determine the thickness of the substance based on the thermal transfer rate.

5. The device of claim 1 further comprising a biasing element, the biasing element biasing the conduit sensor into communication with the external surface.

6. The device of claim 5 wherein the conduit sensor further comprises a thermistor, thermocouple, infrared sensor, infrared camera, integrated-circuit (IC) temperature sensor, or resistance temperature detector (RTD).

7. The device of claim 1 wherein the sensor is disposed in external, non-breaching communication with the fluid conduit.

8. A flow restriction measurement device, comprising:

a conduit sensor in communication with an external surface of a fluid conduit having a cross section, the conduit sensor operable for thermal sensing:

an ambient temperature sensor for reading an ambient temperature in an environment through which the fluid conduit passes;

a circuit having flow logic for computing a flow restriction through the fluid conduit based on the thermal sensing and the ambient temperature; and an interface to a fluid source, the fluid source emanating a flow having a temperature, the flow restriction impeding the flow through the fluid conduit.

9. The device of claim 8 wherein a fluid emanated from the fluid source exhibits a pattern of periodic fluctuations in the temperature of the flow, and the flow logic computes the thickness based on changes to a magnitude of the temperature of the flow and a time interval for attaining the temperature.

10. The device of claim 9 wherein the temperature of the flow attains a peak during an interval of each of the periodic fluctuations, and the flow logic computes the thickness based on a plurality of the peaks.

11. A flow restriction measurement device, comprising:

a conduit sensor in communication with an external surface of a fluid conduit having a cross section, the conduit sensor operable for thermal sensing;

an ambient temperature sensor for reading an ambient temperature in an environment through which the fluid conduit passes;

a circuit having flow logic for computing a flow restriction through the fluid conduit based on the thermal sensing and the ambient temperature; and an annunciator signal, the annunciator signal indicative of a threshold of the flow restriction, the threshold based on a cross section reduction in the in the fluid conduit.

12. The device of claim 11 further comprising a network interface and an annunciator message, the flow logic configured to invoke the network interface for transmitting the annunciator message indicative of the flow restriction.

13. The device of claim 12 wherein the annunciator message is indicative of one or more of an overtemperature condition, an undertemperature condition and an excessive cycle length.

14. The device of claim 12 wherein the annunciator message is indicative of one or more of a duct blockage, electromagnetic failure or an operational inefficiency all based on a series of measured temperature readings.

15. A method for computing an efficiency of a flow source and a fluid flow in a fluid conduit, comprising:

detecting a temperature on a surface of the fluid conduit indicative of a temperature of a flow of a fluid within the conduit;

measuring an ambient temperature of an environment through which the fluid conduit passes;

receiving the fluid from a fluid source, the fluid source emanating a flow of the fluid and having a temperature; and computing a flow restriction through the fluid conduit based on the detected temperature and the ambient temperature, the flow restriction impeding the flow through the conduit.

16. The method of claim 15 wherein computing the flow restriction further comprises identifying a thickness of a substance coating around an inner surface of the fluid conduit.

17. The method of claim 16 further comprising computing a reduction of an effective inner diameter of the fluid conduit based on thermal transfer through an accumulation of the substance.

18. The method of claim 15 wherein computing the flow restriction further comprises computing a rate of temperature change based on the detected temperature over time;

identifying a thermal transfer rate through the substance based on the ambient temperature and a thickness of an accumulation of the substance on an inner surface of the fluid conduit; and determining the thickness of the substance based on the thermal transfer rate.

19. The method of claim 15 further comprising:

identifying a pattern of periodic fluctuations in the temperature of the fluid emanated from the fluid source; and computing the thickness based on changes to a magnitude of the temperature of the flow and a time interval for attaining the temperature.

20. The method of claim 15 further comprising:

transmitting the computed flow restriction to a network, the network coupled to a user device for rendering the flow restriction.

21. The method of claim 20 further comprising:

receiving a plurality of computed flow restrictions based on a plurality of respective fluidic conduits; and rendering, on a graphical user interface (GUI), the computed flow restrictions corresponding to the plurality of respective fluidic conduits.

* * * * *